United States Patent [19]
Ezis et al.

[11] 3,854,189
[45] Dec. 17, 1974

[54] METHOD OF MAKING A BONDED SILICON NITRIDE ARTICLE HAVING PORTIONS OF DIFFERENT DENSITY

[75] Inventors: Andre Ezis, Plymouth; Michael U. Goodyear, Grosse Ile; Karsten H. Styhr, Farmington, all of Mich.

[73] Assignee: Ford Motor Company, Dearborn, Mich.

[22] Filed: Dec. 20, 1973

[21] Appl. No.: 426,834

[52] U.S. Cl. ............... 29/420, 29/156.8 B, 29/470, 423/344
[51] Int. Cl. .............................................. B22f 7/06
[58] Field of Search ............ 29/156.8 B, 420, 497.5, 29/498, 470; 264/40, 56, 65, 66, 83, 86; 423/344

[56] References Cited
UNITED STATES PATENTS

| 2,618,565 | 11/1952 | Nicholson | 423/344 X |
| 3,778,231 | 12/1973 | Taylor | 264/66 X |

FOREIGN PATENTS OR APPLICATIONS

| 568,458 | 1/1959 | Canada | 264/65 |
| 779,474 | 7/1957 | Great Britain | 264/86 |
| 887,942 | 1/1962 | Great Britain | 264/66 |
| 895,769 | 5/1962 | Great Britain | 423/344 |
| 1,930,683 | 4/1970 | Germany | 423/344 |

OTHER PUBLICATIONS

R. Gill and G. Spence, "Self Bonded Silicon Nitride," The Refractories Journal, (March 1962) pp. 92–95.

Primary Examiner—C. W. Lanham
Assistant Examiner—D. C. Reiley III
Attorney, Agent, or Firm—William E. Johnson; Keith L. Zerschling

[57] ABSTRACT

A method of making a duo density article of silicon nitride is disclosed. A first element is formed by hot pressing silicon nitride particles. The general shape of a second element is formed by slip casting its shape. The second element is nitrided in a nitriding operation. Facing surface areas of the first element and the second element are bonded together by applying heat on both elements and pressure to one of the elements while the other element is held in a fixed position.

6 Claims, No Drawings

3,854,189

METHOD OF MAKING A BONDED SILICON NITRIDE ARTICLE HAVING PORTIONS OF DIFFERENT DENSITY

This application results from development work carried on for the Department of the Army under Contract No. DAAG 46–71–C–0162.

BACKGROUND OF THE INVENTION

Silicon nitride has a wide variety of uses based on its physical and chemical properties. These uses, to name a few, include thermocouple protection tubes, crucibles for foundry use, substrates for electronic applications and structural components for gas turbine engines.

Silicon nitride can be produced by a number of different processing techniques with each technique yielding a different final density. Each technique also has a definite restriction on the final shape which may be produced. Simple shapes of better than 98 percent theoretical density can be made by hot pressing silicon nitride powder to form the final article. Complex shapes, however, generally cannot be manufactured by this processing technique.

Another processing technique for manufacturing fairly intricate shapes of silicon nitride is slip casting. A slip casting technique generally produces a final article having a density in the range from 80 to 85 percent of theoretical density. In the slip casting technique, silicon metal particles are cast into the desired shape. The silicon metal is then converted, in a nitriding operation, into silicon nitride.

It is generally impossible to fabricate a complete rotor for a gas turbine engine of hot pressed, silicon nitride material. The impossibility of manufacturing such a complete rotor by a hot pressing technique comes about because of the shape of the rotor blades. The shape of such blades can be formed by a slip casting technique. It is impossible, however, to form a complete rotor by a slip casting technique as the hub portion of the rotor formed by this technique cannot withstand the mechanical and the thermal stresses imposed on that portion of the rotor during use in an engine.

This invention teaches a method wherein the best characteristics of hot pressed and slip cast silicon nitride materials are brought together to form a complex article of manufacture such as a rotor for a gas turbine engine. All of the structure is bonded together by a strong and uniform bond at the junction between the different materials.

SUMMARY OF THE INVENTION

This invention is directed to a method of making an article of silicon nitride and, more particularly, to a method of making a duo density article of silicon nitride. The method has the following general steps.

A first element of silicon nitride is formed in a hot pressing operation. In this operation, substantially pure silicon nitride particles are compacted to at least about 98 percent of theoretical density. The compacting of the silicon nitride occurs by applying both heat and pressure to a mixture of silicon nitride particles and a densification aid.

The general shape of a second element is formed in a slip casting operation. The operation is carried out by use of a slip containing silicon metal particles suspended in a vehicle. After its formation, the second element is sintered in an atmosphere formed by a gas which will not react with the silicon metal particles. The second element is nitrided in a nitriding operation so that the element is converted substantially to pure silicon nitride.

A surface area on the first element is brought into close association with a surface area on the second element. The two areas are held in close association with one another. A bond is formed between the associated surfaces of the first and the second elements by applying heat on both elements and pressure on one of the elements while the other of the elements is held in a fixed position. This application of heat and pressure forces a portion of the silicon nitride forming the surface area of the one element into bonding relationship with the silicon nitride forming the surface area of the other element whereby a uniform and a strong bond is formed between the first and second elements thereby uniting both of the elements into a single article having two sections of different density.

DESCRIPTION OF THE PREFERRED EMBODIMENT

A process for making a duo density article of silicon nitride material will be described. The article to be described will be a rotor for a gas turbine engine. The first element of the rotor is its central hub. The second element of the rotor is the outer blade ring over which the hot gases of the engine flow to turn the rotor.

The method of making a duo density article of silicon nitride in accordance with the general teachings of this invention is initiated by forming a first element which, in this case, is the hub of the rotor. The first element is formed by compacting a mixture consisting of from about 95 to 99.5 percent by weight of silicon nitride particles and from about 5 to 0.5 percent by weight of a densification aid. This mixture is compacted to a density of at least 98 percent theoretical density. The compacting of the mixture is carried out by applying heat and pressure to the mixture, thereby forcing it into a compact form.

In general, the silicon nitride use in the compacting operation is alpha silicon nitride powder. The powder is generally a ceramic grade and is preferably all minus 325 mesh. The silicon nitride powder is wet ball milled in a rubber lined mill with alumina or tungsten carbide balls and alcohol for a time ranging from 1 day to 2 weeks. A densification aid, such as magnesium oxide or any other suitable material, is mixed thoroughly with the silicon nitride powder during the milling operation. Concentrations of the densification aid are generally in the range from about 0.5 to 5.0 weight percent. The aid helps in the powder compaction process. After milling, the silicon nitride powder slurry is dried and screened through a 100 mesh screen for hot pressing.

The hub or first element is hot pressed to the approximate final dimensions and contours in a graphite die system. Barrier materials are coated on the graphite die to minimize any reaction between the powder and the die system. The barrier material commonly used is graphite foil. The silicon nitride material is hot pressed at a temperature from about 1,650°C to about 1,800°C and at a pressure of from about 3,000 psi to about 4,000 psi. The pressing operation takes place for a time from one to three hours. The final article produced by this method is the first element of hot pressed silicon nitride material. The material has a density in excess of 98 percent theoretical and is extremely strong. The material readily withstands both the temperature and the stress load imposed when it is used as the hub portion of a turbine rotor.

The general shape of the second element, which in this case is the turbine blade ring of complex configuration, is slip cast as a single unit. The blade ring has individual blades extending radially outwardly from a ring interconnecting all the blades. The interconnecting ring has an inwardly facing circumferential surface.

The second element is formed by pouring a slip of silicon metal particles in a vehicle into a mold which is the negative of the shape desired. The mold is porous to draw out the vehicle thereby leaving behind silicon metal particles in the shape desired. Full details of slip casting techniques are set forth in U.S. Pat. Application Ser. No. 415,898, entitled "Process for Making a Silicon Nitride Article" filed on Nov. 14, 1973 and assigned to the same assignee as this application. That application is hereby incorporated into this application by reference. A method of making an article of complex shape is also disclosed in U.S. Pat. Application Ser. No. 426,836, entitled "Method for Making an Article of Complex Shape by Slip Casting" filed on Dec. 20, 1973 and assigned to the same assignee as this application. This application is also hereby incorporated by reference.

After the shape of the second element has been formed, the element is sintered so that it has sufficient strength for handling. The sintering takes place in a gaseous atmosphere, such as argon, which does not cause the formation of a second phase in the silicon metal particles. The sintering operation may take place at a temperature in the range of 980°C to 1,180°C and for a period of time from 5 minutes to 12 hours. The element is then subjected to a nitriding operation. Since the element is formed of pure silicon particles, the nitriding operation is effective to change the element into silicon nitride. In the nitriding operation the element is heated while exposed to nitrogen gas at temperatures and for sufficient periods of time that all of the silicon is transformed into silicon nitride.

A full procedure for nitriding silicon to form silicon nitride is disclosed in U.S. Pat. Application Ser. No. 411,599, filed Oct. 30, 1973, entitled "Improved Process for Making Silicon Nitride Articles," which application is assigned to the same assignee as this application. This application also is hereby incorporated by reference. In the nitriding operation, the slip cast silicon is transformed into a silicon nitride material having a density of about 80 to 85 percent of theoretical density.

The first element is bonded to the second element in the following manner. The first element, namely the hot pressed hub, has an outer circumferential surface which is brought into engagement with an inwardly facing circumferential surface of the second element. The surface areas which are brought into close association may be machined on each of the elements so that proper sizing is obtained. The associated elements are placed in a pressing die and heat and pressure are applied thereto while the second element is supported to resist the pressure. The pressure applied on the central hub or first element is from at least about 1,000 lbs. per square inch to about 3,500 lbs. per square inch while the elements are maintained at a temperature in the range from 1,625°C to about 1,700°C for a time of at least 1.5 hours. During this hot pressing operation, a bond is formed between the associated surfaces of the first and second elements as the silicon nitride of both surfaces tends to migrate into the other surface thereby forming a uniform and strong bond therebetween.

The so completed article is thereby formed of silicon nitride material having two different densities. The central portion of the formed article is hot pressed silicon nitride of high density. The outer ring blade is formed of a slip cast silicon nitride material having a density less than the hub. Both of the differently formed silicon nitride materials are uniformly bonded to one another to produce the final article which exhibits all the strength and temperature resistant characteristics for which silicon nitride is known.

There has been disclosed herein a new method of making a duo density article of silicon nitride material. In view of the teachings of this specification, those skilled in the art will be led to make modifications of this invention. It is intended that all modifications which fall within the spirit and scope of this invention be included within the appended claims.

We claim:

1. A method of making a duo density article of silicon nitride which comprises the steps of:
   compacting a mixture consisting of from about 95 to 99.5 percent by weight silicon nitride particles and from about 5 to 0.5 percent by weight of a densification aid to at least 98 percent of theoretical density by use of heat and pressure thereby to form a first element of silicon nitride;
   forming the general shape of a second element by a slip casting operation, said slip casting being accomplished from a slip containing silicon metal particles suspended in a vehicle;
   sintering said second element in an inert atmosphere for a time and at a temperature sufficient to increase the strength of said second element, the inert atmosphere being formed of a gas which will not react with the silicon metal particles;
   nitriding said second element in a nitriding operation so that said element is converted substantially to pure silicon nitride;
   bringing a surface area of said first element into close association with a surface area of said second element;
   holding said associated surfaces of said first and said second elements so they do not move with respect to one another; and
   forming a bond between said associated surfaces of said first and said second elements by applying heat to both elements and pressure on one of said elements while the other of said elements is held thereby to force a portion of the silicon nitride forming said surface area of said one element into bonding relationship with said surface area of the other element.

2. The method of claim 1 wherein: said first element is the one element to which pressure is applied to force its surface area into bonding relationship with said surface area of said second element.

3. The method of claim 1 wherein: said densification aid is magnesium oxide.

4. The method of claim 1 wherein: said compacting operation takes place at a temperature from of about 1,650°C to about 1,800°C at a pressure of from at least 3,000 psi and for a time of at least 1.5 hours.

5. The method of claim 1 wherein: said bond forming operation takes place at a temperature of from about 1,625°C to about 1,700°C at a pressure of at least 1,000 psi and for a time of at least 1.5 hours.

6. The method of claim 1 wherein: said sintering operation is carried out in an argon gas atmosphere, and wherein the sintering temperature is in a range from 980°C to 1,180°C and the sintering time is for a period of from 5 minutes to 12 hours.

* * * * *